No. 835,580. PATENTED NOV. 13, 1906.
J. H. TAYLOR.
PIANO.
APPLICATION FILED APR. 29, 1901.
3 SHEETS—SHEET 1.
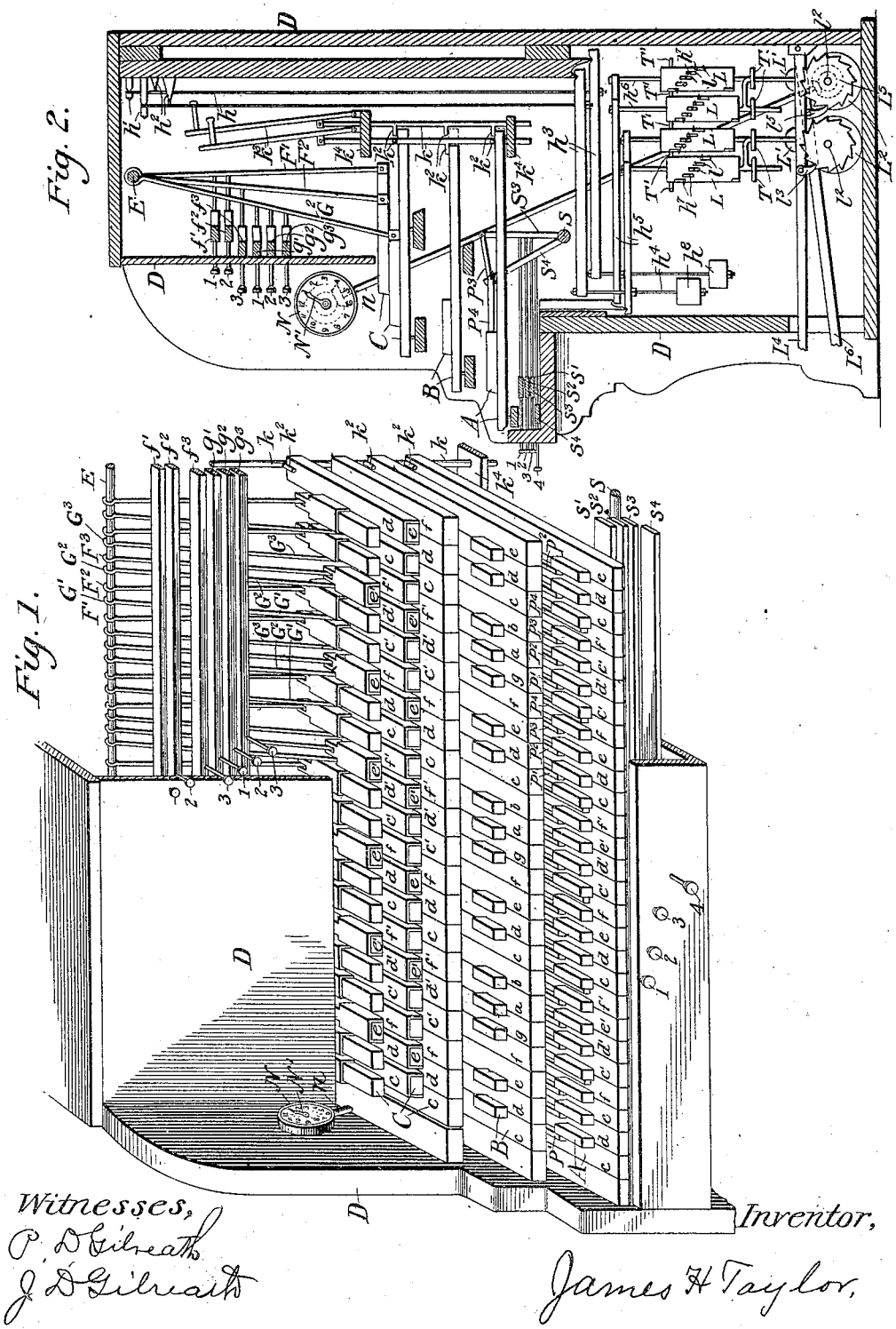
Witnesses,
Inventor,
James H Taylor, No. 835,580.

PATENTED NOV. 13, 1906.

J. H. TAYLOR.
PIANO.
APPLICATION FILED APR. 29, 1901.

3 SHEETS—SHEET 2.

Fig. 3.

Intervals ... 88 ... 44 ... 44 ... 88 ... 88 ... 44 ... 44 ... 88
Vibrations pr. second 528 616 660 704 792 880 924 968 1056

Treble — C D E F C' D' E' F' C

Bass — C D E F C' D' E' F' C

Intervals ... 44 ... 22 ... 22 ... 44 ... 44 ... 22 ... 22 ... 44
Vibrations pr. second 264 308 330 352 396 440 462 484 528

Fig. 4.

Intervals ... 66 ... 66 ... 44 ... 88 ... 88 ... 110 ... 66
Vibrations pr. second 528 594 660 704 792 880 990 1056

Treble — C D E F G A B C

Bass — C D E F G A B C

Intervals ... 33 ... 33 ... 22 ... 44 ... 44 ... 55 ... 33
Vibrations pr. second 264 297 330 352 396 440 495 528

Fig. 5.

66 ... 66 ... 66 ... 66 ... 66 ... 66 ... 66 ... 66 Intervals
528 594 660 726 792 858 924 990 1056 Vibrations pr. second Treble — C D E F C' D' E' F' C Bass — C D E F C' D' E' F' C Intervals ... 33 ... 33 ... 33 ... 33 ... 33 ... 33 ... 33 ... 33
Vibrations pr. second 264 297 330 363 396 429 462 495 528

Witnesses,
P D Gilreath
J D Gilreath

Inventor,
James H. Taylor

No. 835,580. PATENTED NOV. 13, 1906.
J. H. TAYLOR.
PIANO.
APPLICATION FILED APR. 29, 1901.
3 SHEETS—SHEET 3.
Fig. 6.
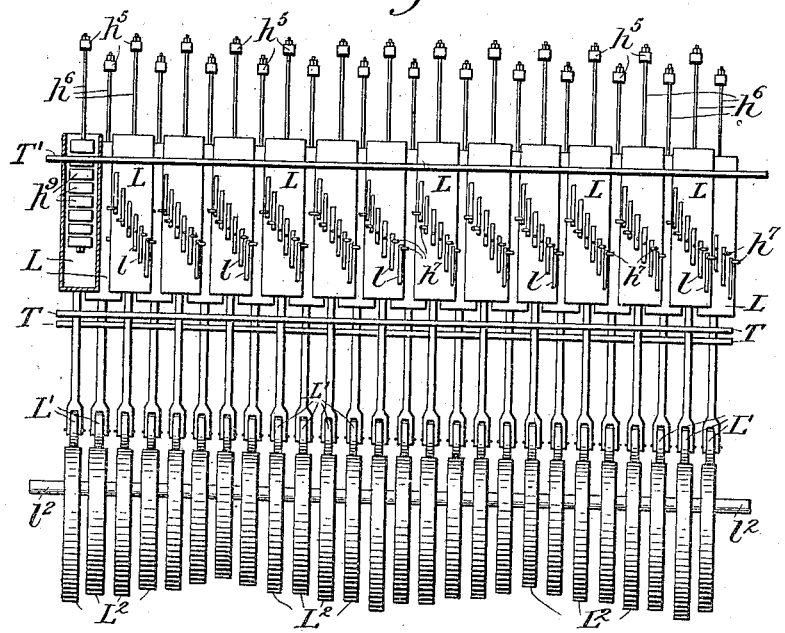
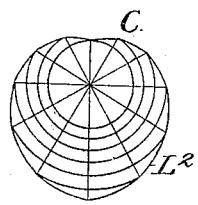 C.
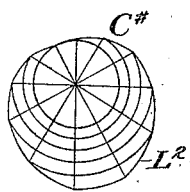 C#
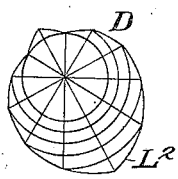 D
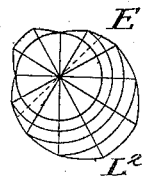 E
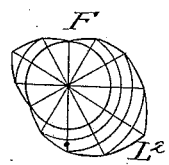 F'
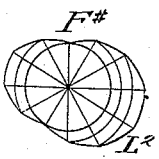 F#
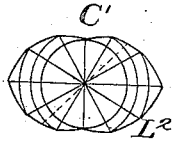 C'
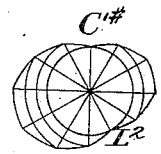 C'#
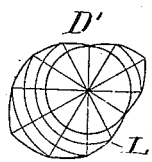 D'
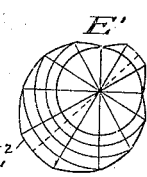 E'
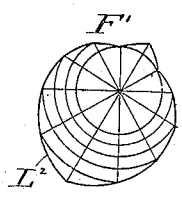 F'
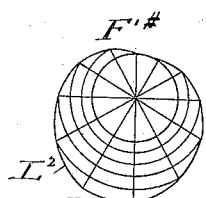 F''#
Witnesses:
J. D. Gilreath
J. H. Ballenger
Inventor:
James H. Taylor.

UNITED STATES PATENT OFFICE.

JAMES H. TAYLOR, OF PARIS, SOUTH CAROLINA.

PIANO.

No. 835,580.   Specification of Letters Patent.   Patented Nov. 13, 1906.

Application filed April 29, 1901. Serial No. 58,073.

*To all whom it may concern:*

Be it known that I, JAMES H. TAYLOR, a citizen of the United States, residing at Paris, in the county of Greenville and State of South Carolina, have invented certain new and useful Improvements in Pianos; and I do hereby declare the following to be a full, clear, and exact description of the invention, such as will enable others skilled in the art to which it appertains to make and use the same.

My invention relates to musical instruments.

The first part of my invention has for its object the introduction of a musical scale or scales which has all of its full-tone intervals equal to each other and all of its semitone intervals equal to each other, so that equal spaces on the keyboard will always represent equal musical intervals, thus enabling me to manipulate the keyboards so as to play all the major scales or keys alike and all the minor scales or keys alike. This can be done in two ways or by two different musical scales or systems of notation, each requiring a different keyboard, which is also different from the keyboard in general use.

A further object of my invention is to combine these three different keyboards into one and the same instrument.

Another object of my invention is to manipulate the new keyboards by drawing key covers or indicators over the keys, so that they will always present the same appearance to the performer, whatever the scale or key to be played.

The object of the second part of my invention is to make the tone-producing devices adjustable, so that they may be adjusted to suit the different keys or scales used in music.

A further object of my invention is to use weights to give tension to the wires or strings used as tone-producing devices.

Another object of my invention is to use a dial-plate and index to show the key or scale for which the instrument is adjusted.

These features are shown by the accompanying drawings, in which like characters represent corresponding parts of the instrument.

Figure 1 is a perspective view of a portion of a piano having three keyboards, showing the arrangement of the keys of each keyboard, parts of the casing being broken away to show the means used for sliding the key-covers over the raised keys. Fig. 2 is a vertical transverse section of the piano. Fig. 3 represents a musical staff for one of my new keyboards. Fig. 4 shows the musical staff in general use; and Fig. 5 a musical staff for my other keyboard, the new staffs showing the relation between the tones and the keys of the keyboard; and Fig. 6 is a back view which shows the means for manipulating the weights.

The tones of the three diatonic scales are represented by letters as follows: Fig. 3, C D E F C' D' E' F' C; Fig. 4, C D E F G A B C; Fig. 5, C D E F C' D' E' F' C. These letters always fall on the same lines and spaces of Fig. 3 and Fig. 5, whether it be the bass or treble staff; but in Fig. 4 they fall on different lines and spaces in the bass-staff and treble-staff, as will be seen. The tones of these three diatonic scales make, respectively, the following number of vibrations in one second of time, as will appear by reference to the treble-staff of the drawings, Fig. 3, Fig. 4, and Fig. 5: Fig. 3, 528, 616, 660, 704, 792, 880, 924, 968, 1,056; Fig. 4, 528, 594, 660, 704, 792, 880, 990, 1,056; Fig. 5, 528, 594, 660, 726, 792, 858, 924, 990, 1,056. All of these tones of the diatonic scale (represented by Fig. 5) are produced on the front bank of keys of keyboard A, tone C being produced by key *c*, tone D by key *d*, &c. All of these tones are separated from each other by full-tone intervals, each of which in the treble-staff is measured by sixty-six vibrations, and each is divided into two equal semitone intervals by the tones of the flats and sharps represented on the staff, Fig. 5, the tones representing the flats and sharps being produced on the rear bank of keys of keyboard A.

All of the tones of the diatonic scale represented by Fig. 4 are produced on the front bank of keys of keyboard B, tone C being produced by key *c*, tone D by key *d*, &c. The intervals in the treble-staff between the tones C and D and between D and E are full-tone intervals, each measured by sixty-six vibrations. The interval between the tones E and F is a semitone interval measured by forty-four vibrations. The intervals between tones F and G and between G and A are full-tone intervals, each measured by eighty-eight vibrations. The interval between the tones A and B is a full-tone interval, measured by one hundred and ten vibrations, and the interval between the tones B and C is a semitone interval of sixty-six vibrations. The tones E and B cannot be sharped because each of them has a semitone interval to its right, and tones F and C cannot be flatted because each of them has a semitone interval to its left. All of the other tones admit of flats and sharps, which come half-way between the tones themselves. The tones representing these flats and sharps are produced on the rear bank of keys of keyboard B.

All of the tones of the diatonic scale represented by Fig. 3 except E and E' are produced on the front bank of keys or the middle bank of keyboard C. When they are produced on the front bank, E and E' are produced on the middle bank, and when they are produced on the middle bank E and E' are produced on the upper bank of keys of keyboard C, tone C being produced by key $c$, tone D by key $d$, &c. In the treble-staff the intervals between the tones C and D, C' and D', F and C', F' and C are all full-tone intervals, and each is measured by eighty-eight vibrations. Each of these full-tone intervals is divided into two equal semitone intervals by the tones representing the flats and sharps of the tones of the diatonic scale. When the tones of the diatonic scale are produced on the front bank of keys, the tones representing their flats and sharps are produced on the middle bank, and when they are produced on the middle bank their flats and sharps are produced on the upper bank of keys of keyboard C. In the treble-staff the intervals between the tones D and E, D' and E', E and F, E' and F' are all semitone intervals, and each is measured by forty-four vibrations. These semitone intervals do not admit of division by flats and sharps.

The upper keyboard C has three banks of keys. The front bank has wide white keys without key-covers; but the middle and upper banks are both provided with key-covers, which are drawn over the keys by means of the levers $F'$ $F^2$ $F^3$ for the key-covers of the upper (or rear) bank and levers $G'$ $G^2$ $G^3$ for the key-covers of the middle bank of keys, the key-covers being of a different color from the keys themselves. These levers are suspended from the horizontal rod E and extend down to the key-covers and are connected to them. The levers $F'$ $F^2$ $F^3$ are connected, respectively, to the boards $f'$ $f^2$ $f^3$, which are connected, respectively, to knobs 1 2 3, by which the key-covers of the upper (or rear) bank are slid over the keys of that bank. The levers $G'$ $G^2$ $G^3$ are connected, respectively, to the boards $g'$ $g^2$ $g^3$, which are connected, respectively, to knobs 1 2 3, by which the key-covers of the middle bank of keys are slid over the keys of that bank, the levers $G'$ being connected to key-covers $c$ and $c'$, levers $G^2$ to key-covers $d$ and $d'$, and levers $G^3$ to key-covers $f$ and $f'$. Every third key-cover of the upper bank of key-covers is connected to one board and are slid in series of every third key-cover. The same is true of the middle bank of key-covers. The middle bank of keys is used as flats and sharps for the front bank, and the upper bank of keys is used as flats and sharps for the middle bank except the tones E and E' of the diatonic scale are always produced on the same bank of keys as the flats and sharps. The letters on the keys of the keyboards are used merely as letters of reference and do not appear on the keys of the instrument. Only one knob of either bank of key-covers is drawn at a time while its keys are being used as flats and sharps of another bank of keys, and every key-cover which is drawn out always represents either of the tones E or E' of the diatonic scale, whether that key-cover be connected with the knobs 1, 2, or 3. For instance, if knob 2 of the middle bank be drawn and we want to play a scale or key one tone higher we push back knob 2 and draw knob 3; but the key-covers connected to knob 2 represent the tones E or E' of the diatonic scale, and so do the key-covers connected to the knob 3 represent the tones of the diatonic scale E and E', and the other tones of the scale assume names from their relation to the tones E and E'. If we had wanted to play a scale or key one tone lower, we would have pushed back knob 2 and drawn out knob 1; but we would have called the key-covers connected to knob 1 "tones $e$ and $e'$ of the diatonic scale." If we were playing on the front bank of keys and using the middle bank as flats and sharps to the tones of the front bank and wanted to play a scale or key a half-tone higher or lower, we would have to draw out all of the knobs of the middle bank of key-covers and use the middle bank for the tones of the diatonic scale and the upper bank except the keys $e$ and $e'$ as flats and sharps to the tones of the middle bank of keys. There are really but two banks of keys, for the upper or rear bank-keys are merely mountings on the front bank of keys.

Keyboard B represents the keyboard in general use and need not be described here.

Keyboard A has two banks of keys. All of the keys of the front bank produce tones of the diatonic scale or the octaves thereof and are separated from each other by equal full-tone intervals. All of the keys of the rear bank are separated from each other by like intervals and are used as flats and sharps to the tones of the front bank. The tones of the diatonic scale, Fig. 5, C D E F C' D' E' F' are produced, respectively, by the keys $c\,d\,e\,f\,c'\,d'\,e'\,f'$, repeated in successive octaves (or nonaves.) Above the keys of the front bank and between the keys of the rear bank of the keyboard are located the pointers or indicators $P'$ $P^2$ $P^3$ $P^4$, which are connected, respectively, to the levers $S'$ $S^2$ $S^3$ $S^4$, which are supported by the rod S, and connected, respectively, to the boards $s'$ $s^2$ $s^3$ $s^4$, which are connected, respectively, to the knobs 1 2 3 4, by means of which the pointers are drawn over the keys like the key-covers are drawn in keyboard C, except every fourth pointer is connected to one board, while every third key-cover is connected to one board. In Fig. 1 every pointer marked $P^4$ is represented as drawn out and all of the others as pushed back. The pointers $P'$ are located over every fourth key of the keyboard, beginning with the first key on the left. Pointers $P^2$ are located over every fourth key of the keyboard, beginning with the second key on the left, $P^3$ over every fourth key of keyboard, beginning with the third key on the left, and pointers $P^4$ are located over every fourth key of the keyboard, beginning with the fourth key on the left. These pointers indicate the scale or key to be played in the same way as the key-covers in keyboard C, the scale or key to be played always having a drawn pointer at its center tone and all of its tones being embraced between the two drawn pointers, which are adjacent to the pointer at the center tone and connected to the same knob as the center pointer.

Keyboard A has sixteen keys to the octave, (or nonave,) counting the keys of both banks of keys, and consequently the octave (nonave) is divided into sixteen equal semitone intervals each of which is measured by one-sixteenth of the vibrations of the key-tone. This is true whether the key-tone makes few or many vibrations per second. In the treble-staff the lower tone, which is always the key-tone, makes five hundred and twenty-eight vibrations, and the upper tone, which is always the octave (nonave) of the key-tone, makes one thousand and fifty-six vibrations. Subtracting the one from the other the remainder is five hundred and twenty-eight vibrations, the same as the vibrations of the key-tone, to be divided into sixteen equal parts. So a semitone on this keyboard is always measured by one-sixteenth of the vibrations of the key-tone, and a full-tone interval is measured by just twice as many vibrations as a semitone interval.

Keyboard B has twelve keys to the octave; but it has three values—sixty-six and eighty-eight and one hundred and ten vibrations—for a full-tone interval, and two values—forty-four and sixty-six vibrations—for a semitone interval, as will appear by reference to Fig. 4.

Keyboard C has twelve keys to the octave, (or nonave,) counting only two banks of keys, for the upper bank of keys are only mountings on the front bank, so there are twelve equal semitone intervals to the octave, (or nonave,) each measured by one-twelfth of the vibrations of the key-tone, and a full-tone interval is always measured by twice as many vibrations as a semitone interval.

The pointers connected to any one knob of keyboard A, and the key-covers connected to any one knob of keyboard C, when only one knob of each keyboard is drawn, divide the keyboards into intervals of half an octave each, for keyboard A has eight keys in its front bank to the octave, (nonave,) and a pointer is drawn over every fourth key of the keyboard, and keyboard C has six key-covers to the octave, (nonave,) and every third one is drawn; but when the instrument is adjusted to play any scale or key the drawn pointers of keyboard A and the drawn key-covers of keyboard C are always one-fourth of an octave from the center tone and one-fourth of an octave from the key-tone or its octave.

Now let us connect the keys of all three of the keyboards to tone-producing devices. If we give the connections for one octave of each keyboard, all of the other octaves will be connected in the same way. For convenience we will take an octave near the center of each keyboard the keys of which will require the following number of vibrations. Keyboard C: key $c$, 528; $c\sharp$, 572; $d$, 616; $e$, 660; $f$, 704; $f\sharp$, 748; $c'$, 792; $c'\sharp$, 836; $d'$, 880; $e'$, 924; $f'$, 968; $f'\sharp$, 1,012; C, 1,056; keyboard B: key $c$, 528; $c\sharp$, 561; $d$, 594; $d\sharp$, 627; $e$, 660; $f$, 704; $f\sharp$, 748; $g$, 792; $g\sharp$, 836; $a$, 880; $a\sharp$, about 935; $b$, 990; $c$, 1,056; keyboard A: $c$, 528; $c\sharp$, 561; $d$, 594; $d\sharp$, 627; $e$, 660; $e\sharp$, 693; $f$, 726; $f\sharp$, 759; $c'$, 792; $c'\sharp$, 825; $d'$, 858; $d'\sharp$, 891; $e'$, 924; $e'\sharp$, 957; $f'$, 990; $f'\sharp$, 1,023; $c$, 1,056.

Key $c$ in all three of the keyboards has five hundred and twenty-eight vibrations. All three keys therefore can be connected to the same tone-producing device. Key $c$ then of each keyboard is connected to the hammer-rod $k$, Figs. 1 and 2, which hammer-rod has projections $k^2$ on it directly over the rear ends of the keys, which lifts the hammer-rod when either key is pressed, causing the hammer $k^3$ to strike the tone-producing device $h$. Pressure on either of the three keys thus connected raises the rear end of the key and raises the hammer-rod $k$ and causes the hammer $k^3$ to strike the tone-producing device, the two keys not pressed upon remaining unmoved until they are pressed upon. Sometimes the two or three keys to be thus connected are not perpendicularly over each other. In such cases the projections on hammer-rod $k$ project according to the location of the key to be connected, sometimes to the front, sometimes to the right, and sometimes to the left. Keys $c\sharp$ of keyboards A and B have the same number of vibrations, five hundred and sixty-one, and are connected to the same tone-producing device in the manner already described; but $c\sharp$ of keyboard C, having a different number of vibrations, requires a separate tone-producing device of its own, to which it is connected in the manner already shown; but its hammer-rod has but one projection. Key $d$ of keyboard A and key $d$ of keyboard B both have the same number of vibrations and are connected to the same tone-producing device; but $d$ of keyboard C, having a different number of vibrations, requires a separate tone-producing device of its own. Keys $d\sharp$ of keyboards A and B both have the same number of vibrations and are connected to the same tone-producing device. Key $d$ of keyboard C cannot be sharped. Keys $e$ of all three keyboards have the same number of vibrations, six hundred and sixty, and are all connected to the same tone-producing device. Key $e\sharp$ of keyboard A requires a separate tone-producing device of its own, as key $e$ of the other two keyboards cannot be sharped. Keys $f$ of keyboards B and C have the same number of vibrations and are connected to the same tone-producing device; but key $f$ of keyboard A requires a separate tone-producing device. Keys $f\sharp$ of keyboards B and C, having the same number of vibrations, seven hundred and forty-eight, are connected to the same tone-producing device; but key $f\sharp$ of keyboard A requires a separate tone-producing device. Keys $c'$ of keyboards A and C and key $g$ of keyboard B all have the same number of vibrations and are connected to the same hammer-rod and the same tone-producing device. Key $g\sharp$ of keyboard B and key $c'\sharp$ of keyboard C having the same number of vibrations are connected to the same hammer-rod; but $c'\sharp$ of keyboard A requires a separate hammer-rod and tone-producing device. Key $a$ of keyboard B and $d'$ of keyboard C having the same number of vibrations, eight hundred and eighty, are connected to the same tone-producing device, but $d'$ of keyboard A requires a separate tone-producing device. Key $d'\sharp$ of keyboard A requires a separate tone-producing device and so does key $a\sharp$ of keyboard B, and keyboard C has no $d'\sharp$. Keys $e'$ of keyboards A and C having the same number of vibrations, nine hundred and twenty-four, are connected to the same tone-producing device. Keyboard B has no key corresponding to $e'$ unless $a\sharp$ be tuned to correspond with it. This is the abnormal part of keyboard B. Key $e'\sharp$, keyboard A, requires a separate tone-producing device, the other two keyboards having no key corresponding to it. Key $f''$ of keyboard A and key $b$ of keyboard B having the same number of vibrations are connected to the same tone-producing device; but key $f'$ of keyboard C requires a separate tone-producing device. Keys $f''\sharp$ of keyboards A and C each requires a separate tone-producing device, and keyboard B has no corresponding key. Keys $c$ of all three keyboards having the same number of vibrations, one thousand and fifty-six, are all connected to the same tone-producing device. This is the octave of the key with which we started. All of the other octaves of the three keyboards are connected to tone-producing devices like the one we have given above.

As has been said, the wires or strings $h$ represent the tone-producing devices, $h$ representing both rows of wires, the front row and rear row, which are fastened to the posts $h'$, passing over the bridges $h^2$, and are connected with the levers $h^3$, from which levers the weights $h^8$ are suspended by the suspension-rods $h^4$ to give tension to the wires or strings $h$, and if greater tension be required it is obtained by the compound levers, consisting of levers $h^5$, coupled to levers $h^3$ by the suspension-rods $h^4$. From levers $h^5$ are suspended by the suspension-rods $h^6$ a number of weights $h^9$, located within the cylinders L, in the sides of which cylinders are a number of slots $l$, spirally arranged. On the bottom of these cylinders are rollers L', which rest on the cams or eccentrics $L^2$, which are fastened to the shafts $l^2$. On the same shafts $l^2$ are fixed the ratchet-wheels $L^3$ and $L^5$, which are operated, respectively, by treadles $L^4$ and $L^6$ and pawls $l^3$ and $l^5$. The two shafts $l^2$ and $l^2$ are geared together, so that the one revolves in the opposite direction from the other. Pressure on the treadle $L^4$ revolves them in one direction, and pressure on treadle $L^6$ revolves them in the opposite direction. The eccentrics $L^2$ are shown in Fig. 6, the shapes of which are more fully shown in the twelve figures above, Fig. 6, which are enough for one octave (nonave) of keyboard C; but sixteen are required for one octave of keyboard A; but as the shapes of these eccentrics are exactly the same for both keyboards A and C one set will answer for both keyboards. It will be seen that there are shown twelve radii on each eccentric. These radii show the points of contact between the eccentrics $L^2$ and the rollers L' when the machine is adjusted to play the twelve different scales or keys used in music; but for keyboard A these same eccentrics would have sixteen radii or points of contact. Each eccentric $L^2$ supports one cylinder L; but as the diameter of the cylinders is greater than the distances between the eccentrics on the shaft every other cylinder must be staggered to the right or left of the shaft in order to give room for the cylinders. Through the slots $l$, spirally arranged in the sides of the cylinders, project stems $h^7$. These stems are attached to weights $h^9$ within the cylinders. The stem passing through the top slot of the cylinders is near the bottom of the slot, the next is a little farther from the bottom of its slot, while the stem passing through the bottom slot of the cylinders is near the top of the slot. So as soon as the cylinders are elevated a little they will lift the top weights $h^9$ from the suspension-rods $h^6$; but they will have to be elevated the entire length of the slots before they will lift the bottom weights. When the ratchet-wheels $L^3$ and $L^5$ are revolved, the eccentrics $L^2$ on the shafts $l^2$ elevate the cylinders L and lift the weights $h^9$ one by one from the suspension-rods $h^6$, and as the cylinders are lowered the weights are deposited one by one on the suspension-rods $h^6$. The weights $h^8$, or, if they are not used, the bottom weight in each cylinder, are sufficient to give the proper tension to the strings $h$ for the tones of the scale or key of C, and the other weights $h^9$ within the cylinders are used to give additional tension to produce the tones of the other scales or keys. The cylinders are guided and held in place by the guide-boards T and T'. It requires very light weights within the cylinders to produce the additional vibrations required by the other scales or keys, for the weights which produce the tones of the scale or key of C are still operative and help to produce the tension required by the other scales. Keyboard B cannot be used except when the instrument is adjusted to play the scale or key of C. The other keyboards require a separate adjustment for each scale or key, though any of the scales or keys can be played when the instrument is adjusted to play a different scale or key a little higher of a little lower; but the scale or key thus played would not be played with the exact pitch which the author intended.

The dial-plate N has twelve figures on its face as follows: "1, 2, 3, 4, 5, 6, 7, 8, 9, 10, 11, 12." These figures represent the different scales or keys used in music, the minor scales being played with the same adjustment as the major. On the dial-plate is a pointer N', which always points to the scale for which the instrument is adjusted. The pointer N' is connected to one of the shafts $l^2$, on which the ratchet-wheels work, and is geared to that shaft through the other shaft $n$ by means of bevel-gears or otherwise. So when the ratchet-wheels are revolved by the treadles $L^4$ and $L^6$ the pointer N' revolves also and points out the scale for which the instrument is adjusted.

I claim as my invention and desire to secure by Letters Patent—

1. In a musical instrument, a keyboard having three banks of keys, each bank having the same number of keys to the octave, the keys of each bank being separated from each other by regular intervals, and tone-producing devices connected therewith, said tone-producing devices having equal musical intervals between them, substantially as described.

2. In a musical instrument, a keyboard having two banks of keys, each bank having the same number of keys to the octave, the keys of each bank being separated from each other by regular intervals, and tone-producing devices connected therewith, said tone-producing devices having equal musical intervals between them, substantially as described.

3. In a musical instrument, a keyboard having three banks of keys with regular and equal intervals between the keys of each bank, and tone-producing devices connected therewith, said tone-producing devices having equal musical intervals between them, all of the keys of the middle and rear banks being provided with key-covers of a different color from the keys themselves, three knobs to which all the key-covers of the same bank are connected in series of every third key to a knob, so that, when only one knob is drawn, every third key appears of a different color from the other keys to indicate the scale or key to be played, and means for sliding the key-covers longitudinally over the keys, substantially as described.

4. In a musical instrument, a keyboard having two banks of keys with regular and equal intervals between the keys of each bank, and tone-producing devices connected therewith, said tone-producing devices having equal musical intervals between them, every key of the front bank having a pointer or indicator over it, four knobs to which all of the indicators are connected in series of every fourth indicator to a knob to indicate the scale or key to be played, and means for sliding the indicators over the keys, substantially as described.

5. In a musical instrument, a keyboard having three banks of keys, the middle and rear banks being provided with key-covers, three knobs connected to each bank of key-covers in a series of every third key-cover to a knob, the key-covers connected to any one knob dividing the keyboard into intervals each of which is equal to half an octave (or nonave), in combination with tone-producing devices, substantially as described.

6. In a musical instrument, a keyboard having two banks of keys with an indicator over each key of the front bank, four knobs to which are connected the indicators in a series of every fourth indicator to a knob, the indicators connected to any one knob dividing the keyboard into intervals each of which is equal to half an octave, (nonave,) in combination with tone-producing devices, substantially as described.

7. A musical instrument having two or more keyboards, the keys of one of the keyboards being arranged in the usual manner to correspond to the tones of the old scale, or system of notation, and the keys of the other keyboards being separated from each other by regular and equal intervals to correspond to the tones of my new scales or systems of notation; and tone-producing devices connected with said keys, said tone-producing devices having equal musical intervals between them; and three knobs with key-covers connected with them, or four knobs with indicators connected with them, in series of every third key-cover to a knob, and every fourth indicator to a knob, the keys of any two or more keyboards requiring the same tone being connected to the same tone-producing device, but any key of either keyboard requiring a tone not used by the other keyboards being connected to a tone-producing device of its own, in combination with the different keyboards and the tone-producing devices, substantially as described.

8. A musical instrument having two or more keyboards, the keys of one of the keyboards being arranged in the usual manner to correspond to the tones of the old scale or system of notation, and the keys of the other keyboards being separated from each other by regular and equal intervals to correspond to the tones of my new scales or systems of notation; and tone-producing devices connected with said keys, said tone-producing devices having equal musical intervals between them; and three knobs with key-covers connected with them for one keyboard by series of every third key-cover to a knob, and four knobs for the other keyboard with indicators connected with them by series of every fourth indicator to a knob; stickers with one or more projections on each to engage the keys of one or more keyboards, and connected with hammer-rods through which the motion of the keys is transmitted to the tone-producing devices; substantially as described.

9. In a musical instrument, the combination of one or more keyboards the keys of each keyboard being separated from each other by regular and equal intervals and having key covers or indicators connected therewith; and tone-producing devices connected with said keys, having equal musical intervals between them; and weights suspended on levers connected with each wire or string used as a tone-producing device in the instrument for the purpose of giving sufficient tension to said wires or strings to produce the tones of the natural scale or key of C, in combination with levers, tone-producing devices and the keys of the keyboards, substantially as described.

10. A musical instrument having two or more keyboards, the keys of one of the keyboards being arranged in the usual way, the keys of the other keyboards being separated from each other by regular and equal intervals, and having key covers or indicators connected therewith; and tone-producing devices connected with said keys, having equal musical intervals between them; and one weight to each tone-producing device to give tension sufficient to produce the tones of the natural scale or key of C, and additional weights to each tone-producing device, suspended on the levers connected with the tone-producing devices to give additional tension to produce the tones of the other scales or keys used in music, the said additional weights having horizontal stems passing through them, and also through the slots in the sides of the cylinders in which they are incased, one cylinder for each tone-producing device with roller underneath and slots in its sides, by means of which the said additional weights are lifted one by one from the levers, or deposited one by one upon them, substantially as described.

11. A musical instrument having two or more keyboards, the keys of one of the keyboards being arranged in the usual way, the keys of the other keyboards being separated from each other by regular and equal intervals, and having key covers or indicators connected therewith; and tone-producing devices connected with said keys, having equal musical intervals between them; and levers connected with said tone-producing devices, having weights suspended on them; one perpendicular cylinder for each tone-producing device in the instrument, the cylinders having perpendicular slots spirally arranged in them through which the projections on the weights pass, a series of weights within the cylinders suspended on the levers to give additional tension to the tone-producing devices, cams or eccentrics on horizontal shafts to elevate and lower the cylinders, ratchet-wheels and ratchets on the horizontal shafts to operate all the parts, substantially as described.

12. A musical instrument, having two or more keyboards, the keys of one of the keyboards being arranged in the usual way, the keys of the other keyboards being separated from each other by regular and equal intervals, and having key covers or indicators connected therewith; and tone-producing devices connected with said keys, having equal musical intervals between them; and levers connected with said tone-producing devices having weights suspended on them; to give tension to the tone-producing devices; and cylinders for elevating and lowering the weights; and horizontal shafts carrying ratchet-wheels and eccentrics; and pedals to revolve the shafts and ratchet-wheels; and a dial-plate and index geared to one of the horizontal shafts and ratchet-wheels by which the index is revolved to indicate the scale or key for which the instrument is adjusted to play; substantially as described.

In testimony whereof I affix my signature in presence of two witnesses.

JAMES H. TAYLOR.

In presence of—
W. D. WHITMIRE,
J. D. GILREATH.